United States Patent [19]

Hoarty et al.

[11] Patent Number: 5,110,362
[45] Date of Patent: May 5, 1992

[54] CEMENT COMPOSITIONS

[76] Inventors: John T. Hoarty, 1 Barn Lane, Golborne, nr Warrington WA3 3NR; Leslie Hodgkinson, 10 Lindi Avenue, Grappenhall, Warrington WA4 2SJ; Michael J. Waddicor, Beechcroft, St. Matthews Close, Appleton, Warrington WA4 5DE, all of England

[21] Appl. No.: 491,704

[22] Filed: Mar. 12, 1990

Related U.S. Application Data

[63] Continuation of PCT/GB89/00496, May 10, 1989.

[30] Foreign Application Priority Data

May 11, 1988 [GB] United Kingdom ............... 8811171

[51] Int. Cl.$^5$ ................................................ C04B 7/13
[52] U.S. Cl. ..................................... 106/708; 106/724; 106/802; 106/DIG. 1
[58] Field of Search ................. 106/708, DIG. 1, 724, 106/802

[56] References Cited

U.S. PATENT DOCUMENTS 4,257,815  3/1981  Hauser ........................... 106/DIG. 1
4,828,619  5/1989  Matsushita et al. .......... 106/DIG. 1

Primary Examiner—William R. Dixon, Jr.
Assistant Examiner—Anthony J. Green
Attorney, Agent, or Firm—Cushman, Darby & Cushman

[57] ABSTRACT

Cement compositions containing fly ash having a carbon content are given satisfactory air entrainment by including a water soluble C8 fatty acid salt.

2 Claims, No Drawings

CEMENT COMPOSITIONS

This is a continuation of PCT/GB89/00496, filed May 10, 1989 which included the U.S. as a designated filing.

FIELD OF THE INVENTION

The invention relates to cement compositions and to additives for use in such compositions which improve the air entrainment properties during manufacture. In particular, the invention relates to cement compositions containing pulverised fuel ash which contains carbon as a component.

BACKGROUND TO THE INVENTION

Cement compositions with which the invention is concerned includes concretes which comprise cement aggregate, sand and water; mortars which comprise cement, sand and water; lime sand and water or mixtures containing both lime and cement. High pressure steam cured concretes comprising cement aggregate and water, lime or limestone and siliceous materials such as silica flour and water are also included. The improved physical characteristics produced in cement compositions prepared according to this invention result from air entrainment. The entraining of air in such compositions is known to improve durability of concretes, particularly resistance to frost damage and also improve the flow characteristics, which are of importance for cement pumping and other concrete placing operations. The working characteristics of mortars are also improved by entraining a proportion of air which can reduce the proportion of lime required in the composition.

It has been proposed to utilize pulverised fuel ash, also referred to as flyash, as a component in concretes and the requirements for such a component are given in British Standard 3892 (Part 1) 1982, however the present invention is not limited to the fuel ashes described in this standard. The pulverised fuel ash, as it will be termed in this specification, is the ash residue from pulverised fuel. The Applicants have found the presence of carbon in the fuel ash reduces the ability of air entraining agents to operate effectively.

Thus the present invention describes cement compositions having a proportion of pulverised fuel ash as a component, usually up to about 65% and having a loss on ignition up to about 12%, with an air entrainment agent which is effective despite the presence of the carbon.

GENERAL DESCRIPTION OF INVENTION

The invention provides a cement composition containing up to about 65% of pulverised fuel ash and an air entrainment agent together with an amount of a water soluble $C_8$ fatty acid salt effective to negate the surface activity of the carbon content of the fuel ash. The C8 fatty acid salt is preferentially absorbed on the carbon surface thus allowing the air entrainment agent to remain free in the composition. Usually the fatty acid salt used will be the sodium or potassium salt but the invention contemplates having an additive, the fatty acid, added to the cement composition which reacts with other components of the composition to generate the desired fatty acid salts in situ. The upper level of C8 fatty acid salt added is usually determined by economic factors but it is usually not above about 0.1%, more usually not above 0.05% w/w on the amount of cement.

The air entrainment agent is preferably the water soluble C9 and C10 fatty acid salts described in GB 1435301 (Unilever); these are added preferably in an amount of 0.005 to 0.1% by weight of the active binder i.e. cement in the formulation. The active binder is the cement in a cementiferous composition and/or the calcium silicate produced by reaction of lime or limestone with siliceous materials in the compositions. Other air entrainment agents are usable with the octanoate salt of the present invention. Examples of these agents are salts of vinsol resins (abietic acid salts) ether sulphates, alkyl sulphonates, alkyl aryl sulphonates, salts of fatty acids and amine oxide salts.

The additive defined above provides air entrainment which is stable over a period and effective for pulverised fuel ashes having a range of loss on ignition (LOI) values. The latter values measure the loss of water and other volatiles, and in particular carbon, at elevated temperatures. The water soluble C8 fatty acid salts are effective with LOI of from about 1.5% to about 6% by weight.

Suitable fatty acid fractions for use in this invention may be obtained as by product fractions from the distillation of vegetable oils, for example coconut or ground nut oils, which contain a proportion of the desired chain length acids.

SPECIFIC DESCRIPTION OF INVENTION

The following experiments illustrate the benefit achieved with the use of the cement additive of the invention.

A cementitious composition comprising

|  | $Kg/m^3$ |
| --- | --- |
| Ordinary Portland Cement | 200 |
| Pulverised Fuel Ash | 100 |
| Almington Pit Sand (Grade M) | 600 |
| Croxden 20 mm's, Gravel | 850 |
| Croxden 10 mm's, Gravel | 375 |
| Free Water | 175 |

The composition was formed into concrete using the procedure described in British Standard 5075.

The additive comprised 6% of sodium octanoate and 8% sodium decanoate in aqueous solution The performance of the additive was compared with that of a solution of 14% sodium vinsolate, a material widely used in this application. The air content was measured by the method given in British Standard 5075. That is four sets of experiments were conducted using pulverised fuel ashes with varying levels of carbon content (loss on ignition).

For each set of experiments both the additive and sodium vinsolate were used to produce air entrained concretes. The stability of the air in the concrete was then measured before and after vigorous mixing. The objective was to introduce an air entrainment of about 6% V/V.

In all cases, the air void system produced by the additive was markedly superior to that produced by sodium vinsolate in that the retained air was more stable and thus the rate of air loss was lower with the additive of the invention. The additive was dosed as mls per 50 Kg cement.

EXPERIMENT 1

| PULVERISED FUEL ASH, SOURCE 1 | | | | | |
|---|---|---|---|---|---|
| | | | AIR CONTENT (% V.V) | | |
| | | DOSE | | ADDITIONAL MIXING | |
| NOMINAL L.O.I | ADMIX- TURE | (mls/50 Kg) | INI- TIAL | 2 MINS MIXING | 4 MINS MIXING |
| Low | The additive | 100 | 7.5 | 7.5 | 7.3 |
| Low | Vinsol Resin Type | 80 | 5.6 | 4.7 | 3.9 |

EXPERIMENT 2

| PULVERISED FUEL ASH, SOURCE 2 | | | | | |
|---|---|---|---|---|---|
| | | | AIR CONTENT (% V.V) | | |
| | | DOSE | | ADDITIONAL MIXING | |
| NOMINAL L.O.I | ADMIX- TURE | (mls/50 Kg) | INI- TIAL | 2 MINS MIXING | 4 MINS MIXING |
| Medium | The additive | 50 | 6.0 | 6.0 | 6.0 |
| Medium | Vinsol Resin Type | 40 | 6.0 | 4.5 | 3.6 |

EXPERIMENT 3

| PULVERISED FUEL ASH, SOURCE 3 | | | | | |
|---|---|---|---|---|---|
| | | | AIR CONTENT (% V.V) | | |
| | | DOSE | | ADDITIONAL MIXING | |
| NOMINAL L.O.I | ADMIX- TURE | (mls/50 Kg) | INI- TIAL | 2 MINS MIXING | 4 MINS MIXING |
| High | The additive | 100 | 7.5 | 7.6 | 7.3 |
| High | Vinsol Resin Type | 100 | 6.6 | 4.6 | 3.7 |

EXPERIMENT 4

| PULVERISED FUEL ASH, SOURCE 4 | | | | | |
|---|---|---|---|---|---|
| | | | AIR CONTENT (% V.V) | | |
| | | DOSE | | ADDITIONAL MIXING | |
| NOMINAL L.O.I | ADMIX- TURE | (mls/50 Kg) | INI- TIAL | 2 MINS MIXING | 4 MINS MIXING |
| High | The additive | 250 | 6.8 | 6.2 | 6.1 |
| High | Vinsol Resin Type | 200 | 6.1 | 2.8 | 1.7 |

EXPERIMENT 5

A cement additive composition prepared from:

| | |
|---|---|
| C8/C10 fatty acids (60/40% w/w) | 15% by wt |
| Sodium hydroxide solution (100° Tw) | 8.5% |
| Tetralon A (a surfactant)* | 1.0% |
| Water | Remainder |

*was obtained from Allied Colloids of Low Moor, Bradford, England.

was tested for air entrainment using a pulverised fuel ash containing 5.7% carbon (LOI). This additive composition gave 4.7% air entrainment while the use of 6% C8 fatty acid and 6% C10 fatty acid (i.e. 12% w/w of a 50:50 mixture) gave 3.4% air entrainment. Thus the benefit of using C8 fatty acid salt is clearly demonstrated. The C8 fatty acid alone gave no air entrainment and the C10 acid alone gave a value (2.0%) below that required by the British Standard (4.5 ± 1.5%)

We claim:

1. In a cement composition comprising cement and greater than 0 and up to 65% by weight of pulverised fuel ash having a range of loss on ignition of about 1.5% to about [6%] 12% by weight, the improvement which comprises adding an are entraining effective amount of an air entrainment agent selected from the group consisting of water soluble C9/C10 fatty acids salts, abietic acid salts, ether sulphates, alkyl sulphonates, alkyl aryl sulphonates and amine oxide salts together with an effective amount of sodium or potassium octanoate, the octanoate being present in an amount sufficient to stabilize entrained air and lower the rate of air loss.

2. A cement composition according to claim 1 wherein the amount of octainoate is at most about 0.1% by weight of cement present.

* * * * *